(No Model.)
J. WOODLEY.
CUTTING APPARATUS FOR REAPERS AND MOWERS.
No. 291,563. Patented Jan. 8, 1884.
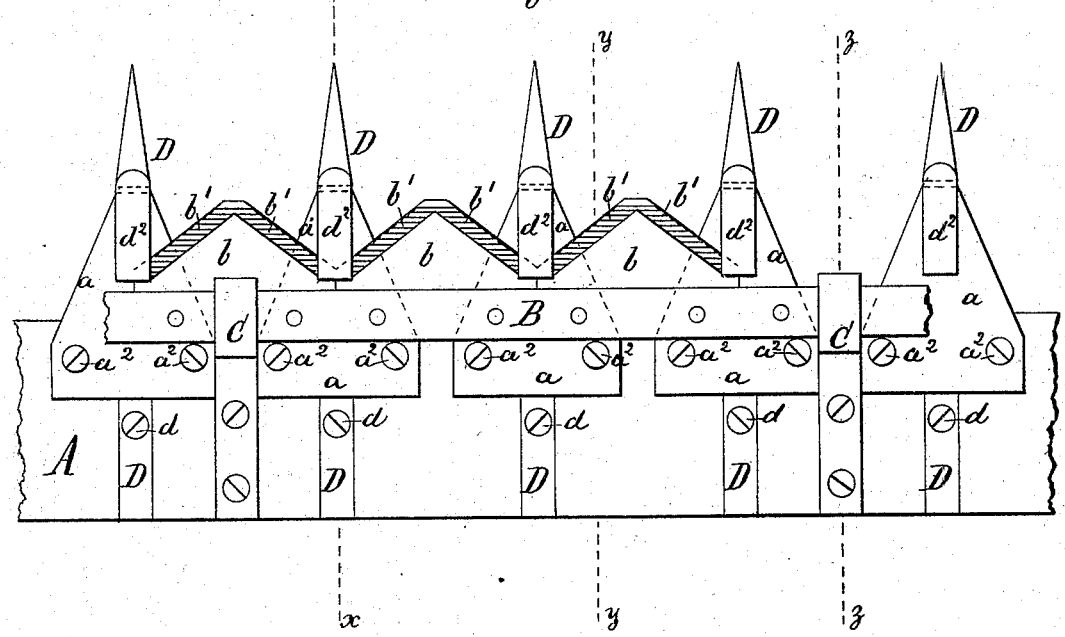
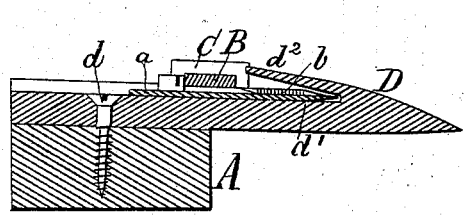
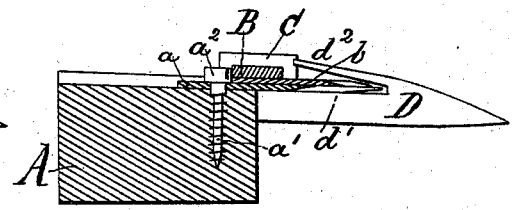
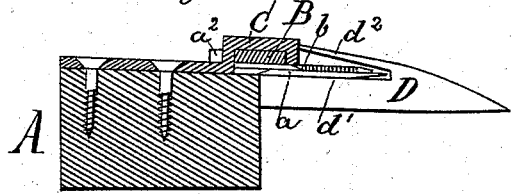
Witnesses:
B. C. Fenwick.
Robt. L. Fenwick.
Inventor:
Jacob Woodley
by his attys
Fenwick & Laurence
N. PETERS. Photo-Lithographer, Washington, D. C.

UNITED STATES PATENT OFFICE.

JACOB WOODLEY, OF HAMPTON, IOWA, ASSIGNOR OF ONE-HALF TO THOS. H. COBLE, OF SAME PLACE.

CUTTING APPARATUS FOR REAPERS AND MOWERS.

SPECIFICATION forming part of Letters Patent No. 291,563, dated January 8, 1884.

Application filed September 27, 1883. (No model.)

*To all whom it may concern:*

Be it known that I, JACOB WOODLEY, a citizen of the United States, residing at Hampton, in the county of Franklin and State of Iowa, have invented a new and useful Improvement in Cutting Apparatus for Reapers and Mowers, of which the following is a specification.

My invention relates to certain improvements in the construction of that class of cutting apparatus for reapers and mowers which employ stationary blades, open-cap guard-fingers, and reciprocating blades, as will be hereinafter fully described and specifically claimed.

The objects of my invention are to facilitate the operation of cutting, prevent clogging of the cutters, and lessen the cost of construction.

In the accompanying drawings, Figure 1 is a top view of a portion of my cutting apparatus for reapers and mowers. Fig. 2 is a section in the line $x\ x$ of Fig. 1. Fig. 3 is a section in the line $y\ y$ of Fig. 1. Fig. 4 is a section in the line $z\ z$ of Fig. 1.

A represents a portion of the finger-bar carrying stationary cutting-blades $a$ and open-cap guard-fingers D, and B a portion of the bar carrying the reciprocating blades $b$. The finger-bar is fastened to the platform of the machine, and the upper bar, with its blades, is reciprocated by any suitable well-known mechanism. The finger-bar A is made of wood, by preference, and the shanks of its guard-fingers D are fastened in depressions on top of it by screws $d$, while the lower V-shaped sharp-edged blades, $a$, which are placed upon the fingers and extended under their open caps, as shown, are fastened by means of set-screws $a'$, passed down on each side of the fingers into the finger-bar. The screws $a'$ are arranged in a straight line, and are provided with round heads $a^2$, which project sufficiently upward to form the rear bearings of the bar B, carrying the upper cutters, $b$. These cutters $b$ are applied on the under side of the bar B and secured by riveting, or otherwise suitably fastened. These cutters are placed upon or in direct contact with the lower cutters, $a$, their oblique edges being beveled on top and serrated or formed with file-cuts or grooves $b'$, which serve to prevent the grain or grass from slipping along the cutting-edges during the cutting operation.

A number of guides or clasps, C, are placed, at suitable distances apart, behind and over the cutter-bar B, and screwed to the finger-bar A, for the purpose of keeping the cutter-bar B and cutters $b$ down and in contact with the lower cutters, $a$, and in proper bearing relation with the guide-screw heads $a^2$. These clasps bear against the back and front, as well as upon the top of the cutter-bar B, as shown. The V-shaped cutters $a$ are beveled under their oblique edges, and rest flat upon the lower portion, $d'$, of the guards, being separated from one another from three-fourths to one inch to receive the caps C and to prevent clogging, and they are overhung by the cap portions $d^2$ of the guards, which portions project rearward in an upwardly-slanting direction, leaving ample space above the upper cutters and their bar B for the grass or grain to pass over the cutting apparatus without liability of hanging between the bar and the upper cutters and caps of the guards, and thereby clogging the cutting apparatus and rendering the same inefficient; and by combining the clasps C with the screws $a'$, having heads $a^2$ for holding and guiding the cutter-bar B, a guiding means of great simplicity is secured, as the same series of screws used for fastening the lower cutter-blades answer also as a guide to the bar B, and while this is the case there is no danger of the grass or grain hanging upon the guards or clasps after it passes beyond the caps of the guard-fingers.

What I claim as my invention, and desire to secure by Letters Patent, is—

1. The combination of the finger-bar A, provided with fingers D, and stationary removable cutters $a$, secured to it by screws $a'$, with projecting guide-heads $a^2$, and the bar B, having the upper cutters, $b$, fastened to it, substantially as and for the purpose described.

2. The combination of the finger-bar A, provided with fingers D and cutters $a$, secured by screws $a'$, having guide-heads $a^2$, the upper cutter-bar, B, having cutters $b$, and the clasps C, bearing on the back, top, and front of the cutter-bar B, substantially as and for the purpose described.

3. The combination of the finger-bar A, having guard-fingers D, with inclined open caps $d^2$ and beveled cutters $a$, secured by screws $a'$, having guiding-heads $a^2$, and the upper reciprocating cutter-bar, B, having beveled cutters $b$, with serrated cutting-edges, substantially as and for the purpose described.

JACOB WOODLEY.

Witnesses:
T. B. TAYLOR,
N. S. BARGER.